Jan. 7, 1969  J. A. IRVINE  3,421,060
APPARATUS FOR STABILISING SHIPS
Filed June 1, 1965

United States Patent Office 3,421,060
Patented Jan. 7, 1969

3,421,060
APPARTUS FOR STABILISING SHIPS
John A. Irvine, Penicuik, Midlothian, Scotland, assignor to Findlay, Irvine Limited, Penicuik, Midlothian, Scotland
Filed June 1, 1965, Ser. No. 460,242
Claims priority, application Great Britain, Oct. 27, 1964, 43,810/64
U.S. Cl. 318—18          13 Claims
Int. Cl. G05b *11/00;* H02p *1/00;* B63b *39/00*

ABSTRACT OF THE DISCLOSURE

For stabilising a ship against roll a U-tube filled with mercury and provided with electrodes to form a differential capacitor is arranged in a circuit between an oscillator and a phase-sensitive detector. Changes in phase upon variation of the differential capacitor caused by roll of the ship are applied to actuate a servo for correcting the roll.

---

The present invention relates to apparatus of the type comprising a signal generator adapted to generate a signal related to the attitude of a body in a given plane relative to a datum and connected to servo mechanism responsive to the signal from the signal generator for tending to maintain the body in the datum attitude.

Such apparatus is now widely used in ships to reduce roll and the signal generator employed comprises an arrangement of gyroscopes and associated apparatus which provides signals related to the degree of roll, rate of roll and roll acceleration. These signals are combined in a predetermined manner and are applied to control an hydraulic servo mechanism for actuating fins projecting laterally from the sides of the vessel. The fins are rotated by the servo mechanism and their angles of incidence are thus varied to effect stabilisation.

The known arrangements function satisfactorily in operation but the cost of the signal generator is high and some degree of mechanical unreliability has been experienced in the moving parts of the signal generator.

According to the present invention in apparatus of the type specified the signal generator comprises a U-tube containing liquid, the U-tube being so mounted on the body that a change in attitude of the body from the datum causes liquid to flow from one limb of the U-tube to the other, and means associated with at least one limb of the U-tube to form at least in part a capacitor the capacitance of which varies according to the height of liquid in the limb, the capacitor being so connected in an alternating current circuit as to vary the said signal in dependence upon the capacitance of the capacitor.

The invention will now be described by way of example with reference to the accompanying drawings in which.

Figure 1:
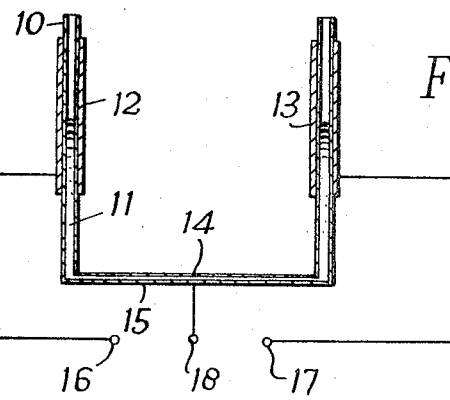
FIGURE 1 is a sectional view of a U-tube and means associated with both limbs thereof to form two capacitors and for use in a signal generator in accordance with one embodiment of the present invention.
Figure 2:
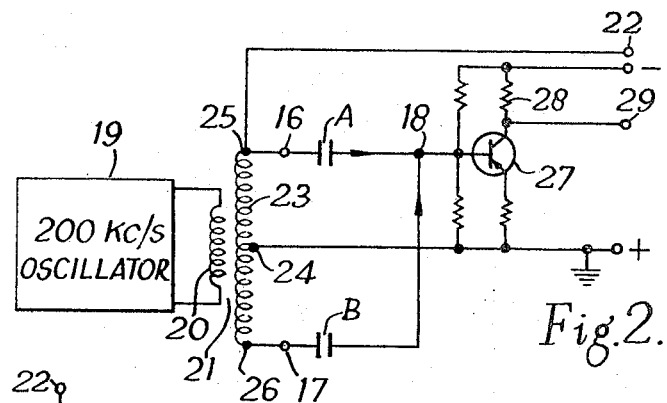
FIGURE 2 shows a portion of the electrical circuit of the signal generator.
Figure 3:
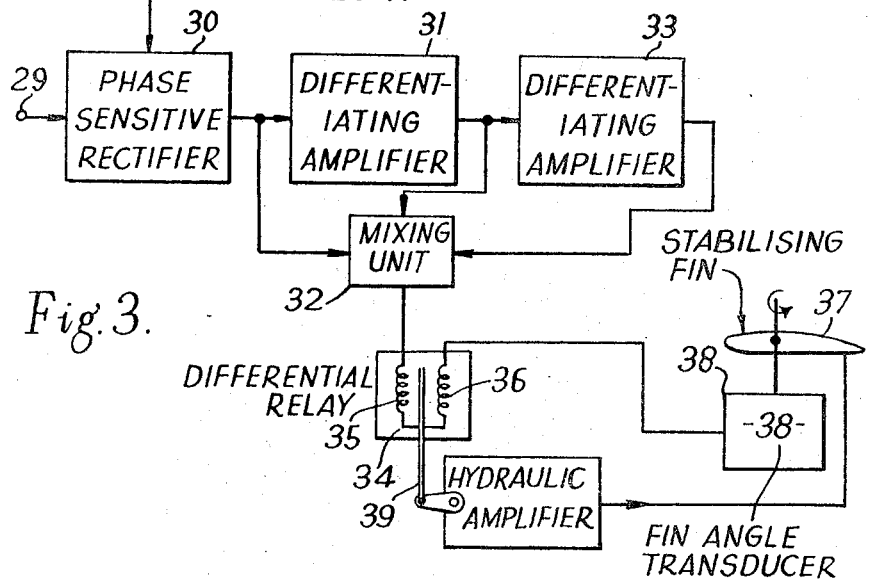
Figure 4:
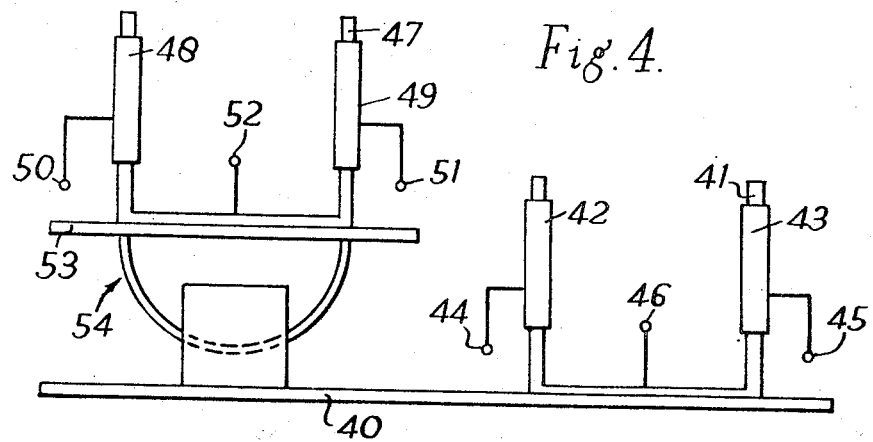
Figure 5:
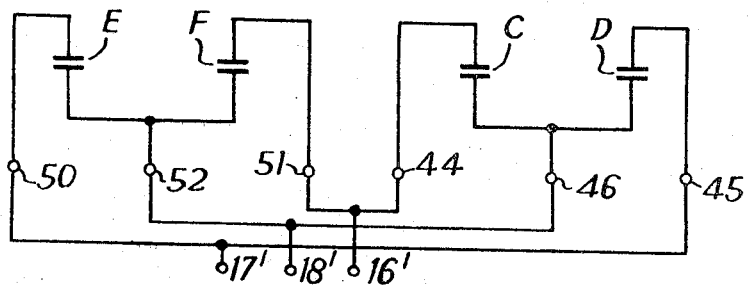
Figure 6:
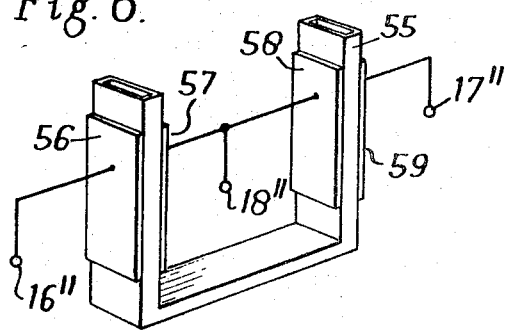

FIGURE 3 is a diagrammatic representation of a further portion of the electrical circuit of the signal generator and of a servo mechanism and a fin, FIGURE 4 is a view of two U-tubes each having means associated with both limbs thereof to form capacitors and for use in a signal generator in accordance with another embodiment of the present invention, FIGURE 5 shows a modification of a portion of the circuit shown in FIGURE 2 to be adopted in that circuit when the arrangement shown in FIGURE 4 is used, FIGURE 6 shows a U-tube and means associated with the limbs thereof to form two capacitors and which may be substituted for the U-tubes shown in FIGURES 1 and 4.

FIGURE 1 shows a U-tube 10 of glass containing mercury 11. The two limbs of the U-tube are provided with cylindrical metal coatings 12 and 13 respectively whereby two capacitors hereinafter referred to as capacitors A and B are provided, the capacitor A comprising the mercury 11 and coating 12 with the glass between and the capacitor B comprising the mercury 11 and coating 13 with the glass between. At 14 an electrode is sealed through the glass into the mercury 11.

Thus by so tilting the tube as to cause mercury to flow from one limb to the other the capacitances of the two capacitors A and B vary differentially.

The U-tube shown is mounted on a transverse bulkhead of a ship so that when a roll occurs the mercury flows from one limb to the other and the relative change in the capacitances of the capacitors A and B is a measure of the extent of the roll.

It will be seen that the section 15 of tube bridging the two limbs of the U-tube is narrow compared with the two limbs. It is made sufficiently narrow to provide critical damping whereby on the occurrence of a roll the mercury does not oscillate between the two limbs of the U-tube. It was found in a practical case that the time constant with critical damping was 0.3 second which is substantially shorter than the duration of a roll on a vessel of the kind to which stabilisers are fitted.

The metal coatings 12 and 13 are connected to terminals 16 and 17 respectively and the electrode at 14 is connected to a terminal 18.

Referring now to FIGURE 2, there is shown one way in which the U-tube of FIGURE 1 can be used to provide a signal giving a measure of roll.

An electric oscillator 19 tuned to 200 kc./s. is connected to the primary winding 20 of a transformer from the secondary winding 23 of which an output is applied to a terminal 22. The secondary winding 23 of the transformer 21 is centre-tapped at 24 and its two outer terminals 25 and 26 are connected to the terminals 16 and 17 respectively of the U-tube of FIGURE 1.

The other terminal 18 of the U-tube is connected to the base of a transistor 27 and the centre-tap 24 is connected to the emitter of the transistor 27. Usual biasing arrangements are provided for the transistor and a load resistor 28 is provided in its collector lead. The collector of the transistor is connected to an output terminal 29.

In operation the oscillations transmitted through the capacitors A and B to the terminal 18 from the secondary winding are arranged to have equal amplitudes when the U-tube is vertical and hence to cancel at the terminal 18.

When the vessel rolls in one direction the capacitors A and B vary differentially in one sense and provide output which is, say, in-phase with the oscillations at 22 and when the vessel rolls in the other direction the capacitors A and B vary differentially in the other sense and provide output at 29 in antiphase with the oscillations at 22. Thus the amplitude and phase of the oscillations at 29 measure the amplitude and sense of the roll which causes them to appear.

Referring now to FIGURE 3 this is a schematic diagram showing one example of apparatus by means of which oscillations appearing at the output terminal 29 can be employed to reduce the roll of a vessel.

The terminals 22 and 29 of FIGURE 2 are connected to a phase-sensitive rectifier 30 which, therefore, provides a rectified output of which the magnitude and sign indicate the amplitude and sense of the roll causing the output.

Two outputs are taken from the rectifier 30, one being applied to a differentiating amplifier 31 and the other to a mixer 32. The output of the amplifier 31 which represents the rate of the roll is applied also to the mixer 32 and to a further differentiating amplifier 33. The output of the latter represents the roll acceleration and is also applied to the mixer 32.

The output of the mixer 32 is, therefore, dependent upon the extent of the roll, the rate of roll and roll acceleration. The proportions in which the three different signals are mixed will depend upon various parameters of the vessel and the overall design of the system and will be chosen in known manner.

A differential electromagnetic control device 34 has two windings 35 and 36 and the output of the mixer 32 is applied to energise the winding 35.

One fin of a pair of stabilising fins provided on the vessel is shown at 37 and the angle of incidence of this fin is measured by a transducer 38 which energises the second winding 36 of the control device 34.

Thus the output member 39 of the control device 34 takes up a position determined by the relative magnitudes and senses of the currents flowing through the two windings 35 and 36.

The output member 39 is connected through an hydraulic amplifier to the fin 37 to control its angle of incidence in a sense such as to oppose rolling of the vessel.

It will be realised that the mercury 11 in the U-tube 10 will be subjected to forces tending to make it flow from one limb to the other if and when the vessel is accelerated laterally and this results in erroneous angles of incidence of the fins. If such erroneous angles of incidence of the fins are found to produce undesirable effects in the motion of the vessel the arrangement shown in FIGURE 4 may be substituted for that shown in FIGURE 1 and the circuit of FIGURE 2 is modified by the circuit shown in FIGURE 5.

FIGURE 4 shows a platform 40 rigidly attached to the vessel and on which is mounted a U-tube 41 similar to the U-tube 10 and having cylindrical coatings 42 and 43 on its limbs and containing mercury. The coatings 42 and 43 are connected to terminals 44 and 45 respectively and an electrode extending into the mercury is connected to a terminal 46. A second U-tube 47 having limb coatings 48 and 49 connected to terminals 50 and 51 and an electrode extending into the mercury and connected to a terminal 52 is mounted on a platform 53. The platform 53 is carried on the platform 40 by stabilising means generally indicated by the reference numeral 54 which maintains the platform 53 in a datum plane regardless of variations of the platform 40 from the datum. The stabilising means 54 may, for example, include a vertical keeping gyroscope and a servo mechanism.

Capacitors C and D are formed by the mercury in the U-tube 41 and the limb coatings 42 and 43 thereof respectively and capacitors E and F are formed by the mercury in the U-tube 47 and the limb coatings 48 and 49 thereof respectively.

As shown in FIGURE 5, the terminals 44 and 51 are connected to a common terminal 16', the terminals 45 and 50 are connected to a common terminal 17' and the electrode terminals 46 and 52 are connected to a common terminal 18'. Thus, the capacitors C and F are in parallel between the terminals 16' and 18' and the capacitors D and E are in parallel between the terminals 17' and 18'.

The circuit shown in FIGURE 5 is substituted for the capacitors A and B in the circuit shown in FIGURE 2 and the terminals 16', 17' and 18' are connected to the terminals 16, 17 and 18 respectively.

If the vessel and platform 40 roll without lateral acceleration thereof the capacitances of the capacitors C and D will vary differentially whilst the capacitances of the capacitors E and F do not vary so that the variations in the capacitances between the terminals 16' and 18', and 17' and 18' is due to variations in the capacitances of the capacitors C and D respectively. In this case the arrangements shown in FIGURES 4 and 3 and in FIGURE 2 as modified by FIGURE 5 function to oppose the roll in a manner identical to that described with reference to FIGURES 1, 2 and 3.

If the vessel and platform 40 roll and are laterally accelerated then the capacitances of the capacitors C and D vary differentially as a function of the roll and lateral acceleration whilst the capacitances of the capacitors E and F vary differentially as a function of the lateral acceleration only. If the lateral acceleration is in a direction such as to cause the capacitances of the capacitors C and D to vary by an amount greater than that which would be appropriate to the roll alone, say for example the capacitance of the capacitor C is increasing and the capacitance of capacitor D is decreasing and the capacitance of capacitor E is increasing and the capacitance of capacitor F is decreasing, then the capacitance between the terminals 16' and 18' will increase and the capacitance between the terminals 17' and 18' will decrease by amounts and rates appropriate to the roll alone.

Likewise if the lateral acceleration is in a direction such as to reduce the variation of the capacitances of capacitors C and D which would otherwise be appropriate to roll alone then the effect of capacitors E and F is again such that the capacitances between the terminals 16' and 18' and the terminals 17' and 18' vary in a manner appropriate to the roll alone.

If the vessel is subjected to lateral acceleration without roll then the capacitances between the terminals 16' and 18' and terminals 17' and 18' will not vary.

A manually variable capacitor may be connected between for example the terminals 16 and 18 or the terminals 16' and 18' so that the stabilising fins may be given an angle of incidence tending to remedy a list of the vessel and the angle of incidence of the fins will then vary about the manually set angle of incidence to oppose rolling motion of the vessel.

FIGURE 6 shows a U-tube 55, the limbs of which are of nonconductive material and of rectangular form in section. Plate-like metal coatings 56, 57, 58 and 59 are provided on the limbs. A liquid of high dielectric constant is provided in the U-tube 55 so that upon the liquid flowing in the U-tube the capacitances of the two capacitors formed between the plates 56 and 57 and between the plates 58 and 59 varies. The plates 57 and 58 are connected to a common terminal 18" and the plates 56 and 59 are connected to terminals 16" and 17". The arrangement shown in FIGURE 6 may be substituted for the arrangement shown in FIGURE 1 or for the two U-tubes 41 and 47 shown in FIGURE 4.

It is to be understood that a coating may be applied to only one limb of the U-tube 10 shown in FIGURE 1 or of each of the U-tubes shown in FIGURE 4. Likewise coatings may be applied to only one of the limbs of the U-tube shown in FIGURE 6. In this case the variable capacitor formed by the mercury and limb coating of the U-tube shown in FIGURE 1 would constitute the capacitor A in FIGURE 2 and the capacitor B would be a capacitor which would preferably be manually variable so as to compensate for any drift in the capacitance A caused by, for example, thermal expansion of the mercury in the U-tube. Similarly, if the capacitance C and F in FIGURE 5 were formed by mercury and limb coatings the capacitors D and E would be formed by capacitances at least one of which would preferably be manually variable.

It is to be understood that whilst the invention has been described in a particular embodiment wherein fins are provided to maintain the body in the datum attitude, other means may be employed such as, for example, in ships, water tanks wherein water is allowed to flow from a tank at one side of the vessel to a tank at the other side of the vessel under the influence of gravity and controlled by a valve operating in response to signals from the signal generator.

What is claimed is:

1. Apparatus for tending to maintain a body in a datum attitude, comprising:
a signal generator including:
   a U-tube containing liquid;
   the said U-tube being mounted on said body;
   means associated with at least one limb of the U-tube to form at least in part a first capacitor the capacitance of which is dependent upon the height of liquid in the limb;
   an oscillator;
   a transformer having its primary winding connected across the output of the oscillator;
   a transistor;
   the said first capacitor being connected between one end of the secondary winding of the transformer and the base of the transistor;
   a phase-sensitive rectifier;
   the said one end of the secondary winding being connected to the said phase-sensitive rectifier;
   a second capacitor;
   the other end of the secondary winding of the transformer being connected through the said second capacitor to the base of said transistor;
   the collector of the transistor being connected to said phase-sensitive rectifier;
   a centre tap on said secondary winding of said transformer;
   said centre tap being connected through a load to the emitter of the transistor;
   a servo mechanism connected to the output of said phase sensitive rectifier, and
   datum attitude maintaining means actuated by said servo mechanism.

2. Apparatus as defined in claim 1 wherein:
said second capacitor is formed at least in part by means associated with the other limb of said U-tube.

3. Apparatus as defined in claim 1, including:
a manually variable capacitor connected in parallel with one of said first and second capacitors.

4. Apparatus as defined in claim 1, including
a first differentiating amplifier;
a second differentiating amplifier; and
a mixing unit;
the output of the phase-sensitive rectifier being connected to said first differentiating amplifier and to said mixing unit;
the output of said first differentiating amplifier being connected to said second differentiating amplifier and to said mixing unit;
The output of said second differentiating amplifier being connected to said mixing unit;
a differential relay;
a hydraulic amplifier;
a pair of fins; and
a fin-angle transducer;
the output of said mixing unit being connected to one side of said differential relay;
said fin-angle transducer being connected to the other side of said differential relay;
said differential relay controlling said hydraulic amplifier;
said hydraulic amplifier controlling the angle of incidence of said fins.

5. Apparatus as defined in claim 1, wherein:
The bore of the portion of the U-tube connecting the two limbs thereof is smaller than the bores of the limbs.

6. Apparatus for tending to maintain a body in a datum attitude comprising:
a signal generator including:
   a first U-tube containing liquid;
   the said first U-tube being mounted on said body;
   means associated with the limb of said U-tube nearer a first side of said body to form at least in part a first capacitor the capacitance of which is dependant upon the height of liquid in said limb;
   a stabilised mounting;
   a second U-tube mounted on said stabilised mounting and in a plane parallel to the plane of the said first U-tube and containing liquid;
   means associated with the limb of the second U-tube further from said first side of said body to form a second capacitor the capacitance of which is dependent upon the height of liquid in said limb;
   an alternating current circuit;
   said first and second capacitors being connected in parallel in said alternating current circuit;
   the output signal of the alternating current circuit being dependent upon the capacitance of the parallel-connected first and second capacitors;
   a servo mechanism connected to said signal generator; and
   datum attitude maintaining means actuated by said servo mechanism.

7. Apparatus as defined in claim 6, wherein:
said alternating current circuit includes:
   an oscillator;
   a transformer having its primary winding connected across the output of said oscillator;
   a transistor;
   the secondary winding of said transformer having a centre tap connected through a load to the emitter of the transistor;
   said capacitors being connected in parallel between one end of said secondary winding and the base of said transistor;
   a further capacitor connected between the other end of said secondary winding and the base of said transistor;
   a phase-sensitive rectifier;
   the collector of said transistor being connected to said phase-sensitive rectifier;
   said one end of said secondary winding being connected to said phase-sensitive rectifier.

8. Apparatus as defined in claim 6, including:
a manually variable capacitor connected in parallel with said first and second capacitors.

9. Apparatus as defined in claim 6, wherein:
the bore of the portion of each U-tube connecting the limbs of the U-tube is smaller than the bores of the associated limbs.

10. Apparatus for tending to maintain a body in a datum attitude, comprising:
a signal generator including:
   a first U-tube containing liquid;
   the said first U-tube being mounted on said body;
   means associated with both limbs of said first U-tube to form at least in part two capacitors the capacitances of which are dependant upon the height of liquid in the respective limbs;
   a stabilised mounting;
   a second U-tube mounted on said stabilised mounting and in a plane parallel to the plane of said first U-tube and containing liquid;
   means associated with both limbs of said second U-tube to form at least in part two capacitors the capacitances of which are dependant upon the height of liquid in the respective limbs;
   an alternating current circuit;
   the capacitor associated with the limb of the first U-tube nearer a first side of the body being in parallel with the capacitor associated with the limb of the second U-tube further from said first side of said body and connected in said alternating current circuit;

the capacitor associated with the limb of the first U-tube further from said first side of said body being in parallel with the capacitor associated with the limb of the second U-tube nearer said first side of said body and connected in said alternating current circuit;

the output signal of the alternating current circuit being dependant upon the capacitances of the two parallel-connected pairs of capacitors;

a servo-mechanism connected to said signal generator; and datum attitude maintaining means actuated by said servo-mechanism.

11. Apparatus as defined in claim 10, wherein:
said alternating current circuit includes:
an oscillator;
a transformer having its primary winding connected across the output of said oscillator;
a transistor;
the secondary winding of said transformer having a centre tap connected through a load to the emitter of said transistor;
one of the parallel-connected pairs of capacitors being connected between one end of said secondary winding and the base of said transistor;
the other of the parallel-connected pairs of capacitors being connected between the other end of said secondary winding and the base of said transistor;
a phase-sensitive rectifier;
the collector of said transistor being connected to said phase-sensitive rectifier;
one of said ends of said secondary winding being connected to said phase-sensitive rectifier.

12. Apparatus as defined in claim 10, including:
a manually variable capacitor connected in parallel with one of said parallel-connected pairs of capacitors.

13. Apparatus as defined in claim 10, wherein:
the bore of the portion of each U-tube connecting the limbs of the respective U-tube is smaller than the bores of the associated limbs.

References Cited

UNITED STATES PATENTS

| | | | |
|---|---|---|---|
| 2,478,956 | 8/1949 | Webber | 318—19 |
| 2,606,310 | 8/1952 | Baker | 318—31 |
| 2,664,530 | 12/1953 | Young | 318—28 XR |
| 2,936,411 | 5/1960 | Doty | 317—246 |
| 3,080,513 | 3/1963 | Edwards | 318—28 |
| 3,218,863 | 11/1965 | Calvert | 317—246 XR |

BENJAMIN DOBECK, *Primary Examiner.*

U.S. Cl. X.R.

114—122; 317—246; 318—28